United States Patent [19]

Scott et al.

[11] Patent Number: 5,774,374
[45] Date of Patent: Jun. 30, 1998

[54] ROAD SURFACE MEASURING DEVICE AND METHOD

[75] Inventors: Dennis P. Scott, Sausalito; Mark Richtman, Novato; Larry D'Arcangelis, Burlingame, all of Calif.

[73] Assignee: Surface Systems, Inc., Sausalito, Calif.

[21] Appl. No.: 538,041

[22] Filed: Oct. 2, 1995

[51] Int. Cl.$^6$ ..................................................... G01B 5/28
[52] U.S. Cl. ........................... 364/561; 364/562; 364/552; 33/521; 73/146
[58] Field of Search .................................. 364/561–562, 364/572, 573, 575, 552; 33/521–523, 773, 775; 73/146

[56] References Cited

U.S. PATENT DOCUMENTS

| | | | |
|---|---|---|---|
| 4,471,530 | 9/1984 | Kirven | ...................................... 33/293 |
| 4,697,352 | 10/1987 | Angove . | |
| 4,821,426 | 4/1989 | Angove . | |
| 5,107,598 | 4/1992 | Woznow et al. | ........................... 33/521 |
| 5,283,630 | 2/1994 | Yoshizumi | ............................... 356/376 |

OTHER PUBLICATIONS

Darlington, J.R., (Dec. 1992) "The Lightweight Pavement Profile Instrument Development and Applications," *Final Report on a Highway Planning and Research Investigation,* Michigan Department of Transportation.
Surface Systems, Inc. brochure, Sausalito, CA. This brochure was distributed by Applicants at a trade show at Lake Tahoe, Neveda, Oct. 4–6, 1994.
CS8200 Computerized Profilograph, Operator's Manual, Aug. 1994, Version2.16, James Cox & Sons Inc., pp. i–52.
Dipstick Auto–Read Road Profiler, May 1993, FACE.
A Half Century With the California Profilograph, Arizona Transportation Research Center, Report No. FHWA–AZ–SP9102, Feb. 1992, 58 Pages.
S.S.I. Draft Security Features, Aspect Automation, Inc. Sep. 19, 1995.

Pavement Rideability Study, Central Direct Federal Division, Allan S. Miller & Candace E. Watson, 1987, pp. i–27.
Measuring Pavement Profu=ile, Concrete Construction, May 1994, pp. 416–422.
Operation of Bridge Profilograph & Evaluation of Profiles, State of California, Dept. of Transportation, Division of Construction, California Test 526, 1978, pp. 1–6.
Operation of Bridge Profilograph & Evaluation of Profiles, State of California, Dept. of Transportation, Division of Construction, California Test 547, 1978, pp. 1–6.
Technical Bulletin, Construction Smooth Concrete Pavements, Concrete Pavement Technology TB–006.0–C, 1990, pp. 1–16.
"What is Road Roughness", Sayers: Basics of Profiling, Rev. Oct. 1, 1994, pp. 1–40.
National Cooperative Highway REsearch Program Synthesis of Highway Pratice 167, "Measurements Specifications, & Acheivements of Smoothness for Pavement Construction", Transportation Research Board, National Research Council, James H. Woodstrom, Nov., 1990, pp. 1–35.
NCHRP Project 20–7, TASK 53, Profilograph Limitations, Correlations, and Calibration Criteria for Effective Performance–Based Speicification, Larry A. Scofield, P.E., pp. i–Appendix5–4.

*Primary Examiner*—James P. Trammell
*Assistant Examiner*—Craig Steven Miller

[57] ABSTRACT

A light weight, bi-directional, computerized profilograph is disclosed. The bi-directional profilograph includes an odometer for measuring the horizontal movement of the profilograph in either a first direction or a second direction, and a road surface measuring device for measuring a road surface profile while the profilograph is traveling in either the first direction or the second direction. A computation device is also included for plotting the profile of the road surface versus the horizontal movement of the profilograph while the profilograph is traveling in either the first direction or the second direction.

32 Claims, 11 Drawing Sheets

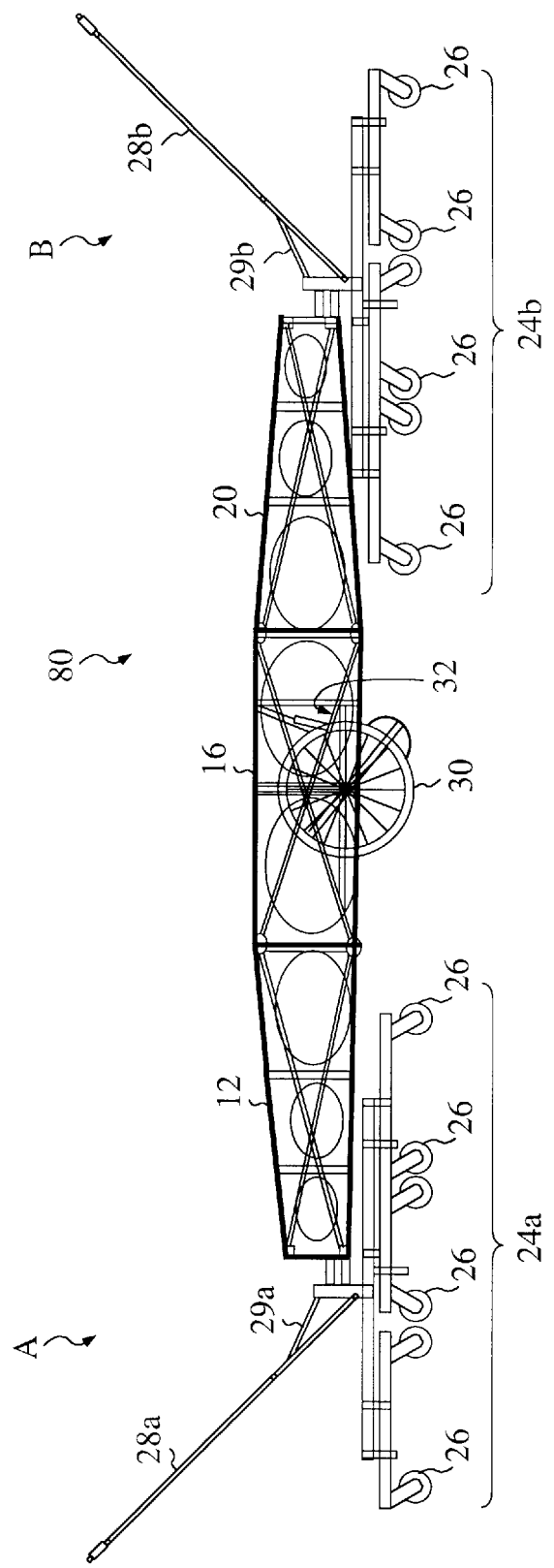

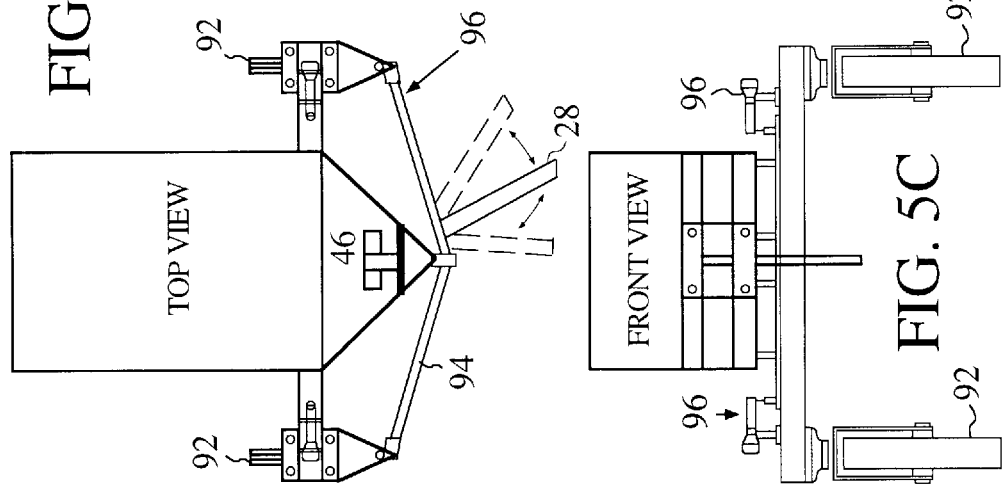
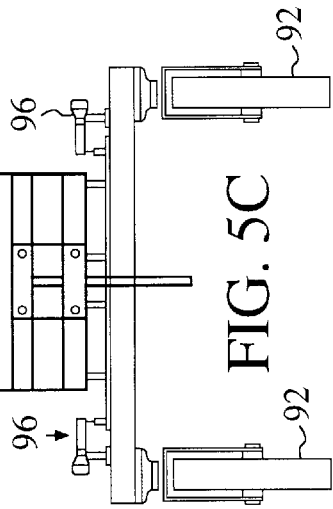
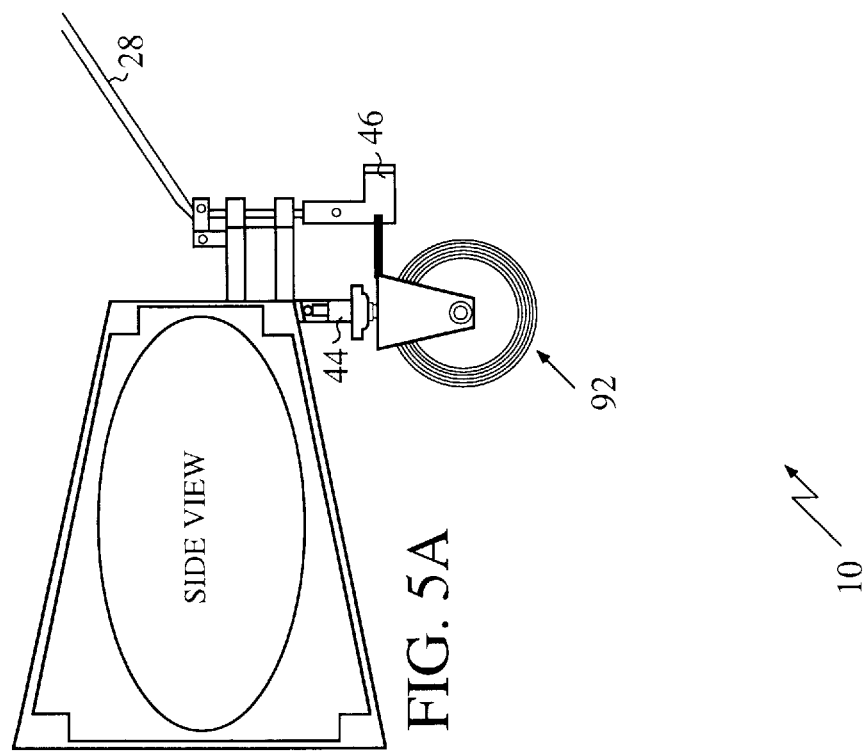

ROAD SURFACE MEASURING DEVICE AND METHOD

BACKGROUND OF THE INVENTION

1. Field of the Invention

The present invention relates to road surface measuring devices, and more particularly, to a light weight, easy to use, bidirectional, computerized, road surface measuring device that can be adjusted to various lengths for generating road surface profiles to meet differing requirements of governmental agencies and construction standards.

2. Background of the Invention

Road surface measuring devices, commonly referred to as profilographs, are used to measure and generate pavement smoothness profile reports. After a stretch of roadway is paved, a profilograph is used to measure the smoothness of the road surface. Any bumps that exceed a predetermined threshold are identified by the road surface profile, and are typically marked for re-grinding and/or resurfacing. With proper use, a profilograph can greatly improve the smoothness and quality of a newly paved highway. Transportation departments of many states require highway construction contractors to design and build roads that adhere to certain test specifications.

The State of California is generally regarded at the forefront of developing and imposing highway construction guidelines and regulations. Test Specification 526 in the State of California, for example, requires that contractors test road surface profile by using a twenty five foot long profilograph, and that the aggregate roughness of newly constructed or refurbished pavement be seven inches or less per mile. Contractors are also required to grind "bumps" in the pavement exceeding 0.3 inches. For more information on the specification in California, see Test Specification 526, Department of Transportation, Division of Construction, Office of Transportation Laboratory, P. O. Box 19128, Sacramento, Calif. 95818. California also has aseparate requirement for bridges and highway on/off ramps. Specifically, the California Test Method No. 547 requires a twelve foot mechanical bridge profilograph to test work on bride decks and on-ramps.

The majority of states that impose highway construction guidelines and regulations follow the California test specifications. Other states, however, such as North Carolina and New Jersey and require a profile testing device having a length of ten feet and different measures for the an acceptable aggregate roughness for a stretch of highway. Without providing a detailed discussion of the highway construction guidelines and regulations for each state that imposes such requirements, it suffices to say that the length and type of profilograph and the test specification requirements varies from state to state.

Several types of profilograph devices are known in the prior art, including the California profilograph, the Rainhart profilograph, the Ames profilograph, the California Bridge profilograph, and the North Carolina and New Jersey profilographs. Each of these devices are briefly described below.

The California profilograph is a low speed, hand-propelled device used for measuring the smoothness of road surfaces. The California profilograph includes a long truss structure with a number of support wheels located at either end of the structure. When pushed along a road surface, the truss structure forms, in effect, a "rolling reference plane". A measuring wheel, located at the center of the truss structure, moves up and down with the road surface as the profilograph is pushed forward. A recording device measures the upward and downward movement of the measuring wheel, and plots the vertical movement of the wheel versus the horizontal movement of the device. For a more detailed description of the California profilograph, see the NCHRP Project 20-7 Task 53 Report, entitled "Profilograph Limitations, Correlations and Calibration Criteria For Effective Performance-Based Specifications," pages 4–8. Several companies offer California style profilographs. James Cox and Sons, Inc., of Colfax, Calif. currently offers a twenty-five foot long computerized profilograph marketed as Model CS 8200. The CS8200 is a micro-computer based profile measuring device for measuring roadway surfaces and for generating reports in response thereto. The McCracken Concrete and Pipe Machinery Co., of Sioux City, Iowa, offers another computerized version of the California profilograph.

The Rainhart profilograph is a low-speed, hand propelled device used for measuring the smoothness of road surfaces. The Rainhart device includes a truss frame structure that is approximately twenty five feet long. The truss frame is supported by twelve equally spaced wheels along the structure, forming, in effect, an "averaging plane". A recording device is provided at the mid-point of the frame. During horizontal movement of the device along a road surface, the vertical movement of the twelve wheels are averaged, and the average vertical movement of the wheels causes a corresponding vertical movement of the averaging plane. The recording device measures the vertical changes in the averaging plane with respect to the horizontal movement of the device, thus generating a road surface profile. The Rainhart Equipment Company Inc., Austin, Tex. commercially offers a non-computerized version of the Rainhart profilograph. For more information on the Rainhart profilograph, see the above referenced NCHRP report, pages 9 through 12.

The Ames Profilograph Company, of Ames, Iowa, offers a profilograph device that differs in design from the California and Rainhart profilographs. The Ames device includes a twenty-five foot long reference beam. The reference beam is supported by six wheels at either end of the reference beam, thus providing a "rolling reference plane" similar to that of the California style profilograph. The beam is hinged at mid-span, where a measuring wheel is located. As the device is pushed forward, the measuring wheel causes the hinged beam to move up and down with the road surface profile. The vertical movement of the hinge is transmitted through a leveraging system to a mechanical recorder, located at the rear of the device. The Ames profilograph is described in detail in U.S. Pat. No. 4,697,352 entitled "Highway Profile Measuring Device" issued to Angove, on Oct. 6, 1987, and U.S. Pat. No. 4,821,426, entitled "Highway Profile Measuring Device" issued to Angove, on Apr. 18, 1989. The Applicants believe that Ames has recently or will soon introduce a computerized version of its profilograph. The Applicants, however, are not aware of any of the details of this computerized version.

The California Bridge profilograph was developed by the California Transportation Department (Caltrans) for the purpose of measuring the road surface profile of bridge decks, elevated structures, and approach on-ramps. The bridge profilograph is twelve feet long, has a large support wheel at each end, and, at one end, two small wheels located at the end tips of a tripod assembly to prevent the profilograph from tipping over. The California profilograph also has a caster-style mid-wheel that moves up and down according to the vertical displacement of the road surface as the device is pushed along the bridge surface. Currently, California bridge profilographs are not automated. A profile is generated by a recording pen connected to the mid-wheel, which plots the profile onto a scroll of paper. The profile trace is then typically analyzed manually, using a plastic template specified by the State of California. For more information on the California Bridge profilograph, see "Operation of Bridge Profilograph and Evaluation Profiles", Department of Transportation, Division of Construction, Office of Transportation Laboratory, Sacramento, Calif., California Test 547, 1978.

The New Jersey profilograph is ten feet long, and includes an elongated metal beam supported by four wheels, two at each end connected by an axle. A caster-style is located at the mid-point of the beam, and moves up and down with the surface irregularity of the road surface during operation. When the mid-wheel is displaced by more than a specified vertical distance, a solenoid is triggered, spraying a small quantity of paint onto the roadway, thereby marking the spot of irregularity. The New Jersey device does not make a permanent record of the aggregate roughness or the surface profile.

The North Carolina profilograph is similar to the New Jersey profilograph. The North Carolina device is ten feet long, one directional, metal beam profilograph. The North Carolina device differs from the New Jersey device in that it is supported by one wheel at each end. It is also equipped with a bicycle wheel located at the mid-point of the device. A recording pen records the vertical movement of the bicycle wheel as the device is pushed along a road surface, thereby creating a road surface trace. An operator is required to manually review the trace, and flag any surface irregularities for corrective measures.

Operators of the prior art California, Rainhart, and Ames profilographs often complain of a number of problems and inconveniences associated with the use of these devices. The California and Rainhart profilographs, with their truss structures, are very heavy (i.e., each approximately five hundred pounds). The heavy weight of the profilographs makes them difficult to transport and assemble. Further, operators have a difficult time pushing these device, particularly up inclines, or controlling the rolling momentum of these devices on downward slopes. Operators have also complained that the truss structures of the Cox, McCracken, and Rainhart devices and the reference beam of the Ames device tend to be unstable and vibrate when being operated in a windy environment, thus causing inaccurate road surface profile reports.

All of the above-described profilographs, when assembled, have a fixed length. The length of the foregoing profilographs cannot be adjusted to accommodate the various machine lengths as required by the different test specifications from state to state. As a result, different and separate machines are needed depending on the state and task. For example, in California, different profilographs are needed to generate profiles for both road surface profiles and bridge decks and approach on-ramps. Further, the profilographs used to measure road surfaces in California cannot be used in other states such as North Carolina and New Jersey, and vice-versa.

During operation, the above mentioned profilographs are typically used to measure a first stretch of a highway. The profilographs are then turned around, and the profile of a second stretch of the highway, adjacent and parallel to the first, is measured. Due to the length and weight of the above mentioned profilographs, they are extremely difficult to turn around, particularly on a narrow roadway. In the alternative, the profilograph is pushed back to the starting point, and the second road surface profile for the second stretch of highway, adjacent and parallel to the first, is generated. The operator is thus forced to push the profilograph back to the starting point, to generate the second profile report.

The prior art computerized profilograph from Cox and McCracken have a number of additional limitations. The Cox and McCracken profilographs are only capable of recording and reporting one directional profiles. If a profile of a parallel stretch of highway adjacent to the first profilograph is to be taken, operators of these profilograph are required to push the machine back to the starting point of the first profile. Furthermore, the Cox profilograph is incapable of applying separate or multiple filtering methods or algorithms to profile data acquired. The Cox profilograph applies a "real time" low pass and a high pass filter to the data as it is acquired. As a result, the data stored in the computer is filtered and therefore cannot be later analyzed or be passed through a different profile algorithm.

The above-identified profilographs can plot or print only one profile run on a single report. As a result, if two or more parallel profiles are taken along a single stretch of highway, operators are required to physically paste together the parallel profiles, typically onto a single piece of paper. This manual procedure is not only time consuming and cumbersome, but it also may introduce inaccuracies into the analysis and use of the profile report. Furthermore, the non-computerized profilographs tend to be crude devices, increasing the time needed to analyze the road profile and leading to inaccuracies in both the generating and interpreting of road surface profile reports.

SUMMARY OF THE INVENTION

The present invention relates to a light weight, bidirectional, computerized profilograph. The bidirectional profilograph includes an odometer for measuring the horizontal movement of the profilograph in either a first direction or a second direction, and a road surface measuring device for measuring a road surface profile while the profilograph is traveling in either the first direction or the second direction. A computation device is also included for plotting the profile of the road surface versus the horizontal movement of the profilograph while the profilograph is traveling in either the first direction or the second direction.

The length of the profilograph can also be easily adjusted for generating either road surface profile reports or bridge profile surface reports. The profilograph includes an elongated frame structure made up of a plurality of subsections. The length of the profilograph can be adjusted by varying the number or length of subsections when assembling the elongated frame structure. For example, if the elongated frame structure is assembled with five subsections, each five feet in length, the profilograph meets the requirements for the Test Specification 526 in California. On the other hand, if the profilograph is assembled with fewer subsections, then the length of the profilograph can be modified for generating bridge and/or on ramp surface profiles or for use in states using shorter length profilographs, such as New Jersey or North Carolina.

The individual subsections, are relatively small, easy to handle, and can be made with a light weight, rigid, inexpensive, and easy to work with material, such as sheet metal, carbon fiber, or plastics. According to various embodiments, each subsection is shaped in the form of a rectangular box approximately three and a half to six feet long. Thus, when broken down, the entire profilograph is easy to handle and transport, for example in the bed of a pick up truck. The subsections are also designed to be readily fastened so that the elongated frame structure can be easily assembled in the field. When assembled, each subsection is arranged in an end-to-end relationship to form the elongated frame structure. Each subsection includes an alignment element so that the sub-sections can be mechanically aligned with the adjacent sub-section in the elongated frame structure. A number of releasable fastening elements are used to fasten the individual sub-sections together. The fastening elements are released to disassemble the profilograph. Each subsection also includes a recess region formed therein. Initial tests have also indicated that the recess regions formed in the individual subsections reduce wind drag on the elongated structure, thereby helping to stabilize the profilograph during operation in inclement weather.

The profilograph of the present invention is much easier to use than prior art profilographs and provides additional features and benefits. The light weight of the profilograph of the present invention makes the profilograph much easier to push up steep inclines or to control the rolling momentum on downward inclines due to the relatively light weight of the device. The varying length of the subsections, and the number of subsections used, provide the operator with the flexibility of assembling the profilograph of the present invention with different overall lengths. For example, the profilograph can be assembled to have a length of ten, twelve, fifteen, twenty five feet, or to any other length to meet a test requirement. The present invention also permits the profilograph user to use interchangeable support wheel assemblies. For example, a total of either four or twelve support wheels can be used.

The profilograph of the present invention is also reversible or bidirectional. The bi-directional feature of the profilograph permits the generation of two road surface profiles for adjacent, parallel stretches of highway without having to either turn the profilograph around or returning the profilograph back to the starting point before generating the second profile.

The computer is also programmed to provide the profilograph of the present invention with a number of novel features. The profilograph of the current invention can plot and print multiple profile runs on a single report, which allows profilograph users to "stack" profile charts for two or more adjacent runs on a single report. The computer is also programmed to print adjacent profilograph runs taken in opposite directions. Thus the present invention allows profilograph testing to report the length and width of road surface imperfections on single or multiple lane roadways. The computer of the present invention gathers and analyzes data in a unique way. The computer first acquires and stores raw profile data in memory. At a later point in time, a user can then run a profile report on the profile data, using anyone of several types of processing algorithms. Lastly, the present invention provides a feature to encrypt the raw data from a profile run so that the data or a profile report can not be tampered with. This feature is particularly attractive for users operating in states which perform audits.

DESCRIPTION OF THE DRAWINGS

FIG. 4 is a side view of the profilograph with several subsections removed according to another embodiment of the present invention.

FIG. 5A, 5B, and 5C is a side, top and front view of a four wheel profilograph according to another embodiment of the present invention respectively.

DESCRIPTION OF THE PREFERRED EMBODIMENT

Figure 1:
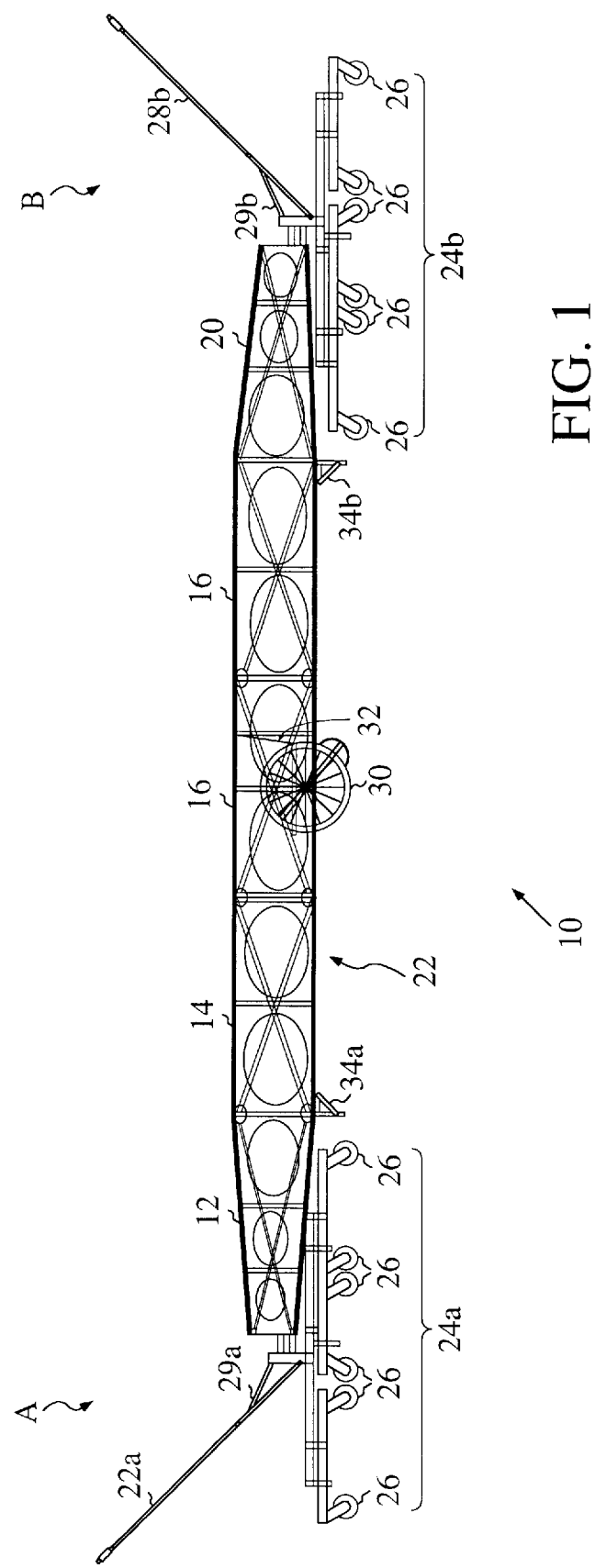
FIG. 1 is a side view of a profilograph for measuring road surface profile reports according to one embodiment of the present invention.

Referring to FIG. 1, a side view of the profilograph according to one embodiment of the present invention is shown. The profilograph 10 in this embodiment includes five subsections 12, 14, 16, 18 and 20 mechanically coupled together to form an elongated frame structure 22. A first rolling support structure 24a is located at one end of the profilograph 10 and a second rolling support structure 24b is located at the opposite end of the profilograph 10. The first rolling support structure 24a and the second rolling support structure 24b include six wheels 26 respectively. Together, the five subsections 12, 14, 16, 18, and 20, the two support structures 24, and the wheels 26 form "rolling reference plane" similar to that of the California style profilographs described in the background section of the present application. One end of the profilograph 10 is designated as end A and the other side is designated as end B.

The profilograph 10 also includes a first height adjustable handle 28a mechanically coupled to section 12 of the profilograph 10. A second height adjustable handle 28b is mechanically coupled to section 20 of the profilograph 10. The first and second handles 28a and 28b may be used to either push or pull the profilograph 10 from either end of the profilograph 10. A pair of resistance devices 29a and 29b, such as air shocks, are provided between the handles 28a and 28b and the profilograph 10 respectively. The resistance devices 29 help to keep the handles 28 in a fixed position and prevents the handles from falling down when unattended by the operator of the profilograph.

Figure 1A:
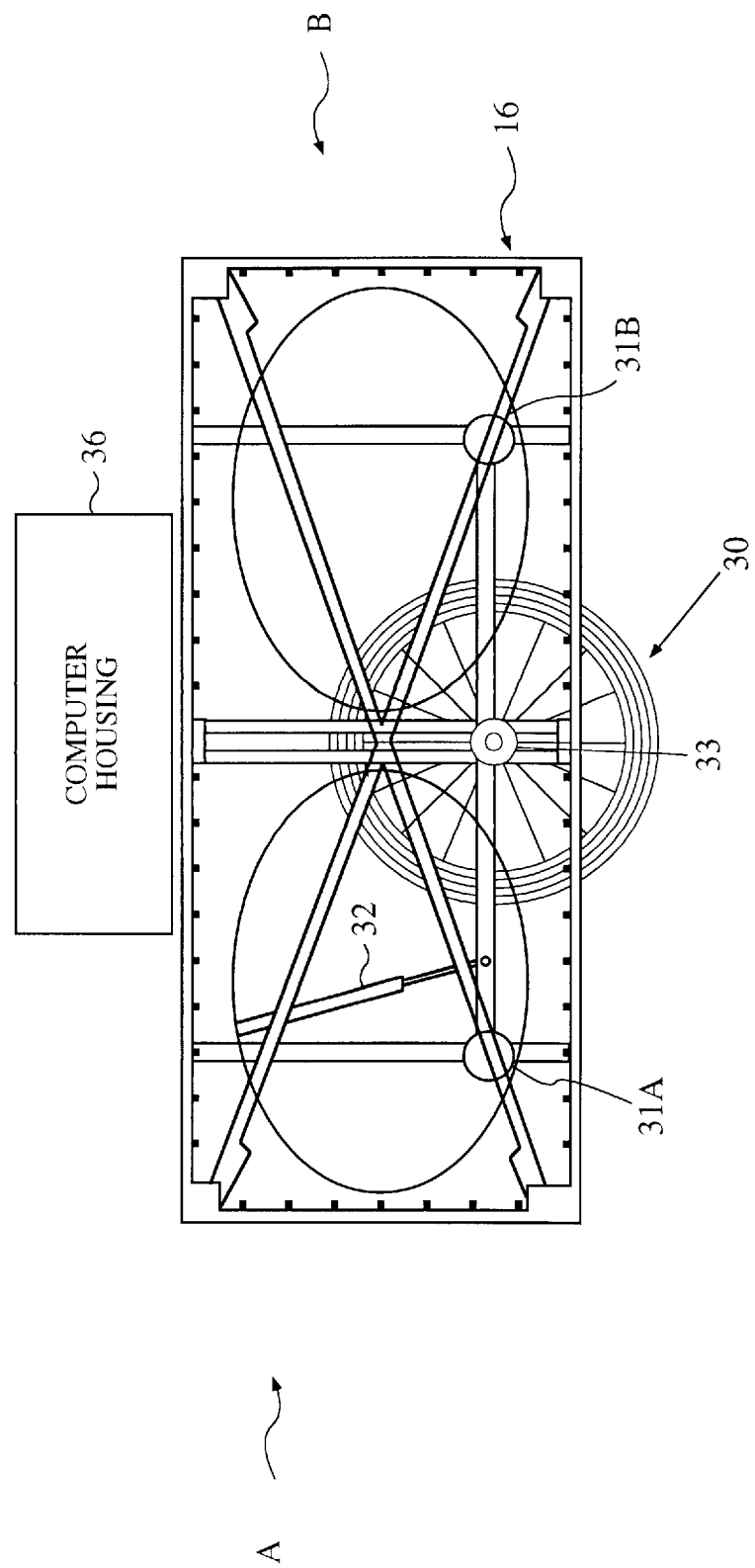
FIG. 1A is an enlarged view of the electronic housing and measuring wheel of the profilograph of the present invention.

Referring to FIG. 1A, and enlarged view of the subsection 16 is shown. The profilograph 10 also includes a measuring wheel 30 positioned approximately at the mid-point of the length of the elongated frame structure 22, at section 16 of the profilograph 10. A dampening device 32, such as an air shock or a compressed spring, is mechanically positioned between the measuring wheel 30 and the frame of section 16 of the profilograph 10. As the measuring wheel 30 moves up and down with respect to the road surface as the profilograph 10 is pushed along a road surface, the dampening device 32 exerts a downward force onto the measuring wheel 30. The force is weak enough to allow the measuring wheel 30 to move up and down with the surface contours of the road, but strong enough to maintain the measuring wheel 30 in contact with the road surface in the event the measuring wheel 30 encounters rocks or other surface imperfections that may otherwise cause the measuring wheel 30 to lift or "bounce" off the road surface. Since the dampening device 32 helps maintain the measuring wheel in contact with the road surface, a more accurate road surface profile is obtained. Two encoders 31A and 31B measure the horizontal movement of the measuring wheel 30 and generates an encoded digital signal indicative thereof. The encoders 31A or 31B are multichannel encoders capable of detecting horizontal movement in the positive or negative direction. A measuring device 33 measures the instantaneous height of the measuring wheel 30, and generates an encoded digital signal indicative of the instantaneous height. The horizontal signals and the height signal are respectively provided to a computer (not shown) in housing 36. In one embodiment, the encoders 31A and 31B have sampling rate 7 to 8 times per foot. In an alternative embodiments, a single encoder 31 may be used.

Referring again to FIG. 1, the profilograph 10 also includes a pair of retractable brake elements 34a and 34b. The brake element 34a is mechanically coupled to the subsection 14. The brake element 34b is mechanically coupled to the subsection 18. When in the braking position, the brake elements 34a and 24b contact the road surface, thereby preventing the profilograph 10 from rolling. When retracted, the brake elements 34a and 34b are no longer in contact with the road surface, and the profilograph 10 is free to roll across the road surface.

Figure 2:
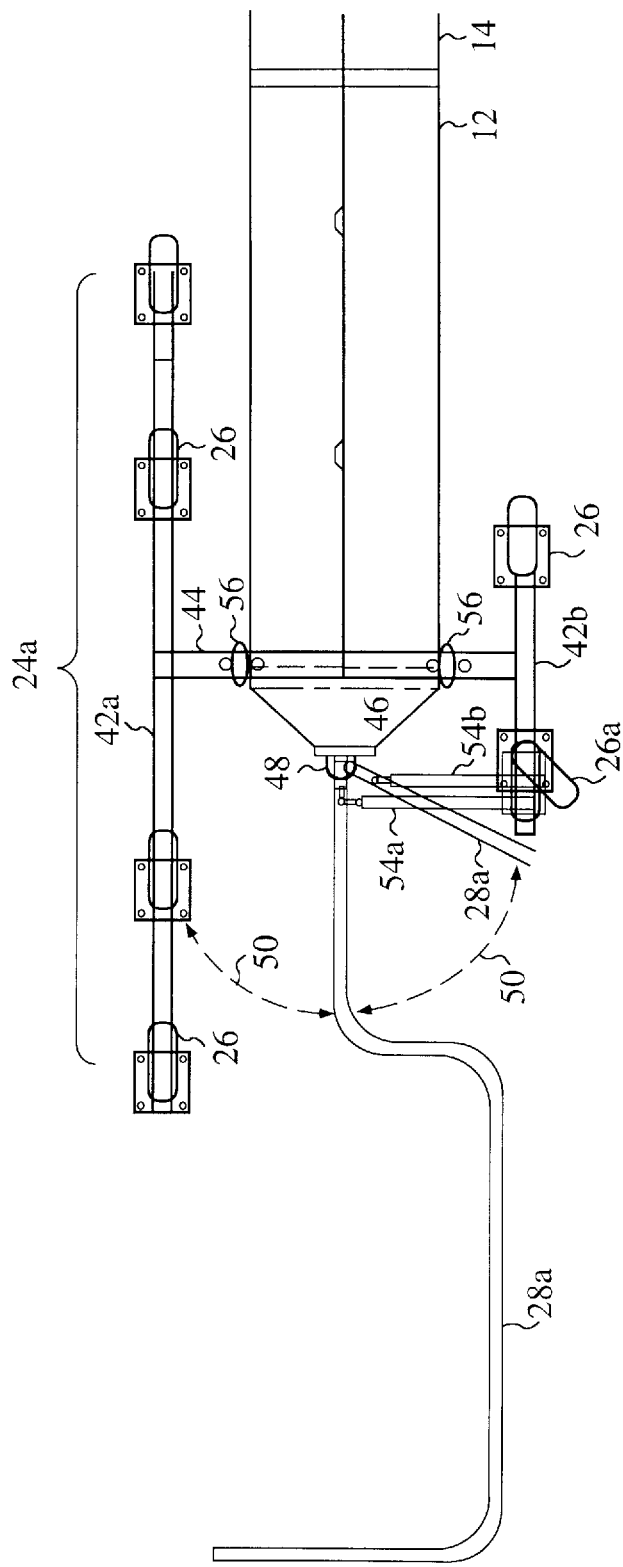
FIG. 2 illustrates a top down view of one end of the profilograph according to the present invention.

FIG. 2 is illustrates a top down view of one end of the profilograph 10. The view includes the first subsection 12, the first rolling support structure 24a including wheels 26, and the first handle 28a. The first rolling support structure 24a includes two parallel elongated members 42a and 42b and a cross member 44. The cross member 44 mechanically fastens the two elongated members 42a and 42b. The first elongated member 42a has four wheels 26 mechanically fastened thereto. The elongated member 42b, which is shorter than the elongated member 42a, has two wheels 26 mechanically fastened thereto. A triangular-shaped boot 46 is mechanically attached to the end of the first subsection 12. The boot 46 includes a tip end 48. The handle 28a is attached to the tip 48 of the boot 46 and rotates around the tip 48, as illustrated by the dashed line 50. A steering cross member 54 is also provided between the tip end 48 of the boot 46 and one or more of the wheels 26. When the handle 28a is rotated in a steering maneuver, the steering cross member 54 helps turn the wheel 26a, thus steering the profilograph 10. (Note, in FIG. 2, the steering cross member 54 is shown in two positions, as designated by reference numbers 54a and 54b, for the purpose of illustrating the steering feature of the present invention.) Lastly, a pair of releasable fastening and alignment elements 56 are used to fastened and align the first subsection 12 to the cross member 44 of the rolling support structure 24a. When unfastened, the fastening elements 56 release the first subsection 12 from the rolling support structure 24a, so the profilograph 10 can be re-assembled in a different configuration or broken down into subsections for transport. According to various embodiments, a number of releasable fastening elements may be used, including bolts, screws, clamps, etc.

Figure 3A:
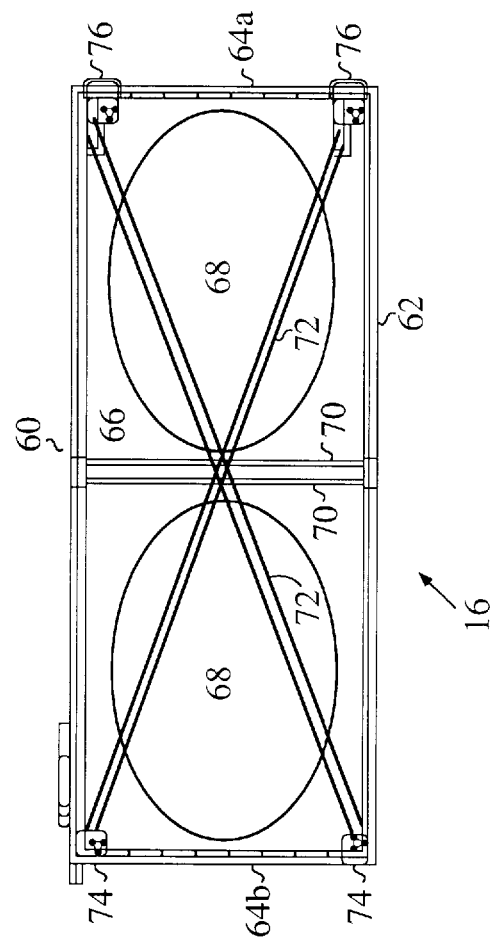
FIG. 3A and 3B is a side and end view respectively of a subsection used in the profilograph according to the present invention.
Figure 3B:
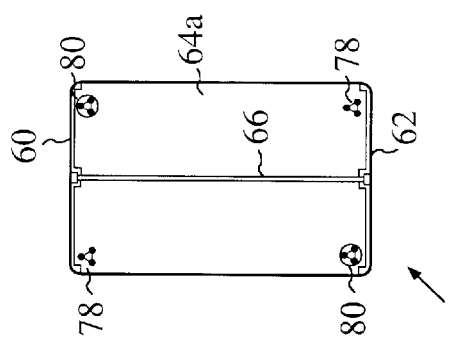

FIGS. 3A, and 3B is a side and an end view of the subsection 16 used in the profilograph 10 of to the present invention. Referring initially to FIG. 3A, the subsection 16 is a rectangular box, having a top surface 60, a bottom surface 62, a first end surface 64a and a second end surface 64b. A plane member 66 is provided at the center plane within subsection 16. A pair of recess regions or holes 68 are provided within the plane member 66. A pair of vertical members 70 are provided between the top surface 60 and the bottom surface 62. A pair of diagonal cross members 72 are also provided between the top surface 60 and the bottom surface 62 of the rectangular box. The centerplane member 66, the vertical members 70 and the diagonal cross members 72 all provide structural support and rigidity for the subsection 16. Two hooks 74 are located at the top corner and the bottom corner along side 64b of the subsection 16. Two releasable clasps 76 are located at the top corner and the bottom corner along side 64a of the subsection 16. The opposite side (not shown) of subsection 16 also includes the vertical members 70, the diagonal members 72, hooks 74 and clasps 76.

Referring to FIG. 3B, two sets of alignments pins 78 are provided on opposite corners of the side 64a of the subsection 16. Two sets of alignments holes 80 are provided on opposite corners of the side 64a of the subsection 16. Although not illustrated, the opposite end 64b of the subsection 16 has a similar arrangement of alignment pins 78 and alignment holes 80.

The other subsections 12, 14, 18 and 20 are essentially the same as subsection 16, and therefore are not described in detail herein. According to various embodiments of the invention the length of each of the subsections 12 through 20 may vary.

The subsections 12 through 20, which form the elongated frame structure 22, are designed to be readily assembled and disassembled in the field. To assemble the elongated frame structure 22, the subsections 12 through 20 are arranged in an end-to-end relationship with respect to one another. The alignment pins 78 of each subsection are then inserted into the alignment holes of the adjacent subsection. The clasps 78 of the subsections are then clamped with the hooks 74 of the adjacent subsection. To complete the assembly of the profilograph 10, the subsection 12 and the subsection 20 are then attached to the first rolling support structure 24a and the second rolling support structure 24b respectively as described above.

According to various embodiments of the invention, the subsection 16 may be made from any light weight, rigid, inexpensive, and easy to fabricate material, such as sheet metal, plastic, or carbon fiber. Further, when broken down, each subsection is light weight and easy to handle. Accordingly, the entire profilograph is very easy to transport, for example in the bed of a pick up truck. Initial tests have also indicated that the recess regions 68 formed in the center plane member 68 greatly reduces wind drag on the elongated structure, thereby helping to stabilize the profilograph during operation in inclement weather.

It should be noted that the length of the individual subsections 12, 14, 16, 18 and 20 can be varied to adjust the overall length of the profilograph 10. For example, if each of the subsections 12 through 20 are five feet long, then the overall length of the profilograph 10 is twenty five feet. The profilograph 10 therefore meets the requirements for the Test Specification 526 in California. In alternative embodiments, the length of individual ones or all of the subsections 12 through 20 can be fabricated to any length, thereby providing the profilograph 10 with the ability to meet any governmental requirement regarding the length of a profilograph.

FIG. 4 is a side view of the profilograph with several subsections removed according to another embodiment of the present invention. The profilograph 80 is essentially the same as that described above, except it is assembled without subsections 14 and 18. The length of the profilograph 80 is therefore shorter than the profilograph shown in FIG. 1. Furthermore, by building the subsections 12 and 20 to variable lengths, the overall length of the profilograph 80 can be altered for various uses. In one embodiment for example, the center subsection 16 is five feet long, and the end subsections 12 and 20 are each two and a half feet long. Consequently, the overall length of the profilograph 80 is ten feet long, meeting the specifications for profilographs as required by the states of North Carolina and New Jersey. Alternatively, the end subsections 12 and 20 are each three and a half feet long, making the overall length of the profilograph twelve feet long, as required in California for bridges and on ramps. Again, the number and length of subsections are arbitrary.

It should be noted that the actual lengths of the profilographs described above are only exemplary, and in no way should be considered as limiting the scope of the invention. Rather, the number and length of the subsections 12 through 20 are arbitrary. By altering the length of one or more of the subsections and by adding or deleting the number of subsections used, a profilograph of the design features described in the present application can be constructed of almost any length.

FIGS. 5A, 5B, and 5C are a side, top and front view of a four wheel profilograph according to another embodiment of the present invention are respectively shown. The profilograph 10 includes four wheels 92, two per end. Each pair of wheels 92 are mechanically connected to the boot 46 by cross member 44. Steering tie rods 94, coupled between the tip of the boot and the wheels 92, are used to steer the profilograph 10 during operation. The wheels 92 are fastened to the cross member 44 by clamps 96. The four wheels can be interchangeably used in place of the support structure 24 and the wheels 26 of the profilograph shown in FIG. 1. It should be noted that the profilograph 10 with four wheels 92 can be used with substantially any length profilograph or number of subsections in the profilograph.

Figure 6:
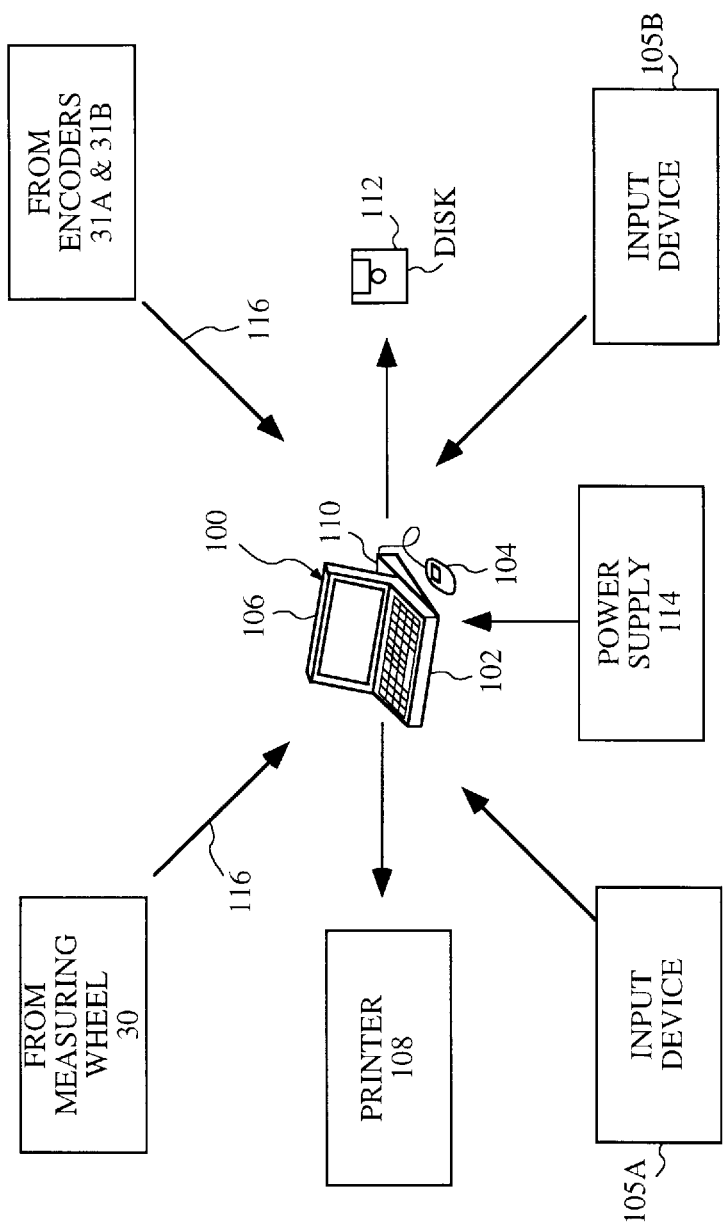
FIG. 6 is a block diagram of a computer and the associated electronics used to generate road surface profile according to the present invention.

Referring to FIG. 6, a block diagram of the computer stored in the computer housing 36 and used to generate road surface profiles is shown. The computer 100 includes a keyboard 102 and a mouse or track ball 104 for entering data and commands to the computer 100, and display 106 for displaying road surface profile reports and other information. The computer 100 may also have associated therewith an optional printer 108 for printing road surface profile reports and a disk drive 110 for storing road surface profile reports on computer disks 112. A power supply 114 is used to provide power to the computer 100. The computer 100 also includes input ports 116 to receive signals from the digitized horizontal and height signals. The computer 100 is also coupled to receive an activation signal from two input devices 105A and 105B located on the handles 28a and 28b at each end of the profilograph respectively. The computer 100 is programmed to generate, display and print road surface profiles. In one embodiment, the computer 100 is a portable lap-top computer, based on the X86 family of microprocessors. In alternative embodiments computers based on the Power PC or any other microprocessor may be used.

Figure 7:
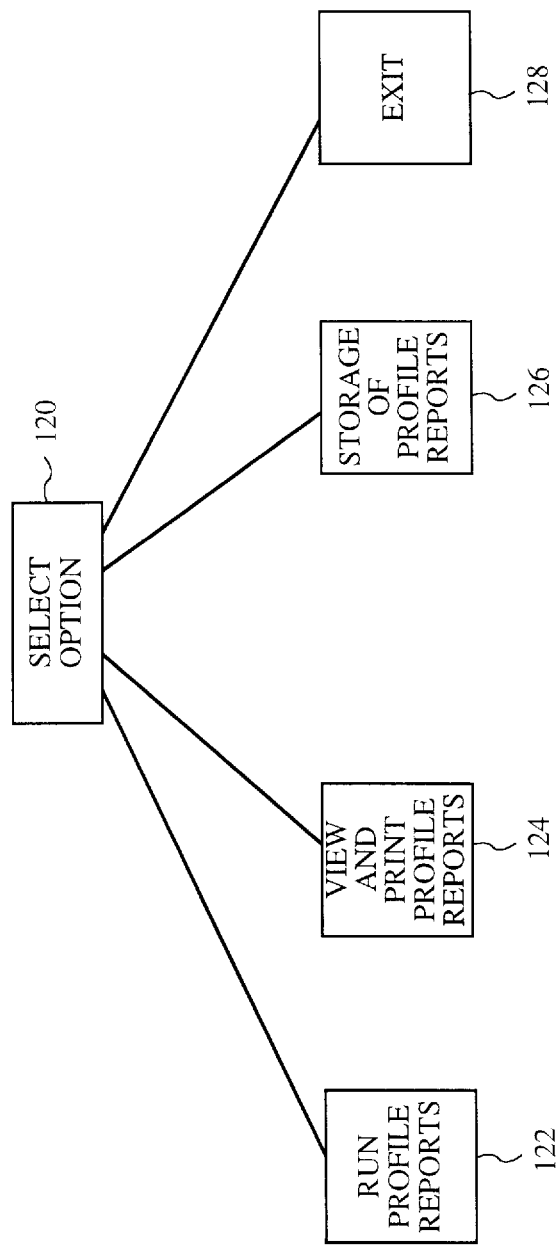
FIG. 7 is an illustration of the main menu for the computer of the present invention.

Referring to FIG. 7, an illustration of the main menu selections appearing on the display 106 of the computer 100 is shown. The user graphical interface of the program provides the user with a prompt 120 to select one of four options. The four options include: (1) "run profile report" 122; (2) "view and print profile reports" 124; (3) "storage of profile reports" 126; and (4) exit 128. The user may select any one of the four options. The storage of profile reports 126 allows the user to select and encrypt certain profile records, including either files containing raw data or processes profile reports. The encryption prevents or discourages the tampering of records. In one embodiment, a well known encryption algorithm is used, such as a PGP encryption algorithm. During operation; the raw data generated during a profile run can be encrypted. The encrypted data can then be sent to the state, or some other authority who can decrypt the raw data and compare it to actual profile reports to verify their accuracy. The encrypted data cannot be decrypted by the user. The exit option allows the user to exit the program. A description of options 122 and 124 are provided below.

In a one embodiment, the computer 100 is programmed with a easy to use graphical user interface. The graphical user interface is permits the user to sequence through the selected options by entering needed data in response to prompts and into designated fields appearing on the display 106. Data is entered by typing, clicking descriptive icons with the mouse, using predefined key strokes, etc., as is well known in the computer arts. Although not described in detail, the user interface of the present invention can be designed using one or a combination of these well known techniques.

Figure 8:
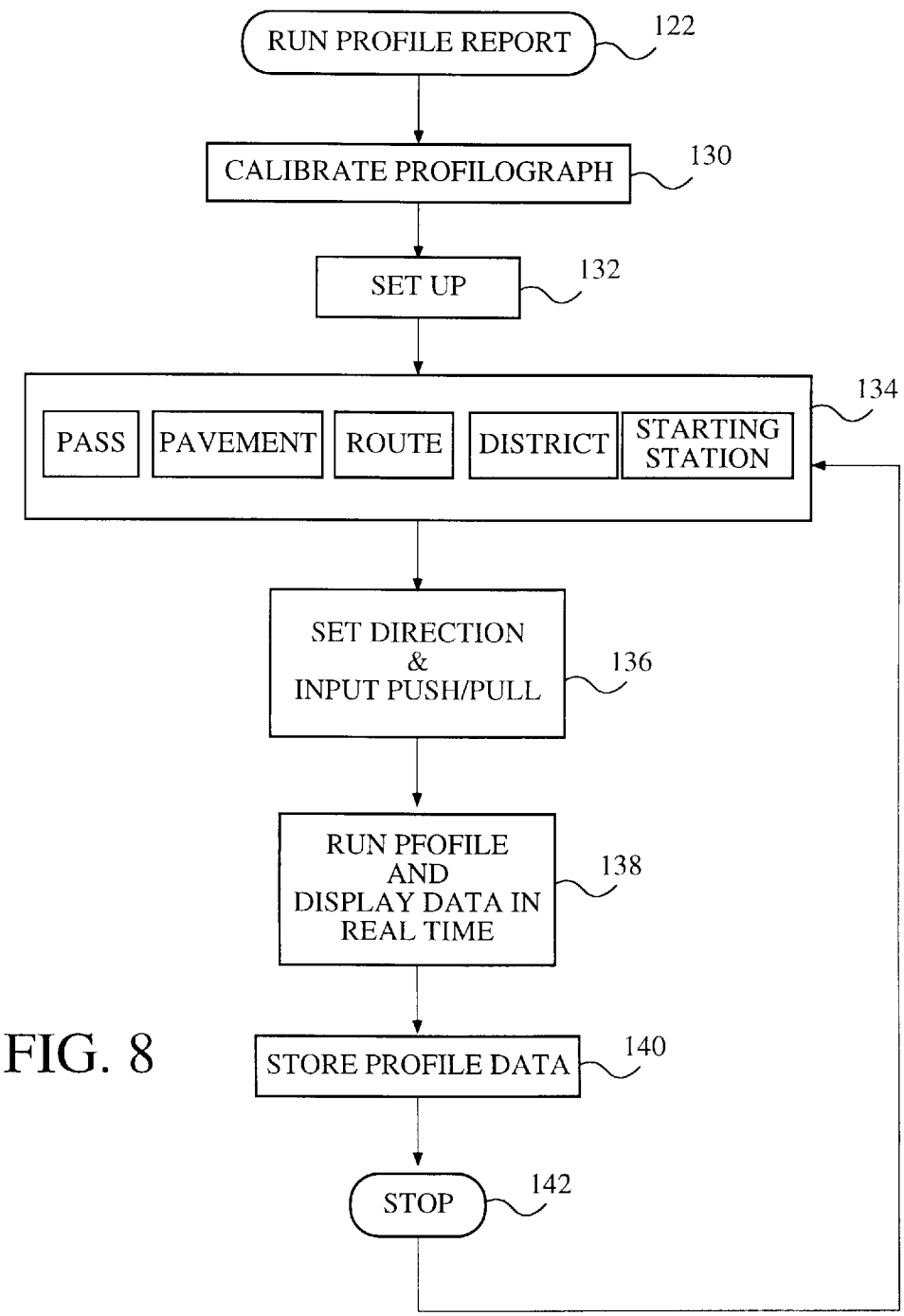
FIG. 8 is a flow diagram illustrating the steps of running a profile report according to the present invention.

FIG. 8 is a flow diagram illustrating the steps of running a profile report according to the present invention. The run profile report option 122 includes the following steps.

In step 130, the user is first required to calibrate the profilograph. This generally required the user to push the profilograph a known distance and then compare it to the odometer reading. The odometer 31 may have to be adjusted to correct for any inaccuracies. The vertical movement of the measuring wheel 30 is also calibrated by rolling the profilograph across an object of known height. The measured height is then compared to the actual height, and the measuring device 33 is calibrated accordingly.

In step 132, the profilograph is set up. This step requires the user to enter such parameters into the computer 100 such as the length of the profilograph, and to select if the measurement and print out of the profile is to be in inches or meters.

In step 134, the user creates a record for the profile run about to be performed. The user may enter using the computer keyboard 102 and track ball 104 certain information regarding the record such as the pass number, the type of pavement, the highway route number, the district the highway is located, the starting point of the profile, etc. In an alternative embodiment, this information can be entered from the end of either handle 28 by using the remote input device 105.

In step 136, the user first enters the "up" direction into the computer. The direction entered into the computer, either up or down, is arbitrary. However, it is good practice to set the direction by the mileage markers, specific to or indicative of the road to be unensured. For example, if the user is at mile (100), and the profile run is going to end at mile (100.1), then the direction of the end of the profile run is defined as the up direction. Next, the user enters into the computer if he is going to push or pull profilograph. For example, if the end A of the profilograph is pointing in the up direction, then the user has to position himself behind end B of the profilograph. The user then activates the input device 105B located on handle 28B. This activates the input signal from encoder 31B. Consequently, when the user starts the profile run, the encoder provides the computer with samples that ascend in order (i.e., 0, 1, 2, 3, . . . n). At the end of the run, the user deactivates the computer 100 via the input device 105B.

If the user would like to perform a second profile run parallel to, and in the opposite direction of the first, the user is required to laterally move the profilograph to a starting point at the same mileage point where the first run ended (100.1). The user then enters into the computer the down direction. The user also enters if he is going to push or pull the profilograph. If the user selects push, then he is required to stand behind end A of the profilograph. When the user activates the input device 105A, it couples the computer 100 to the encoder 31A. Consequently, when the second profile run occurs, the encoder 31A counts and the computer 100 records in descending order (n, n−1, n−2 . . . 1, 0).

Alternatively, the user could perform the second run by turning the profilograph around one hundred and eighty degrees. The user is then required to enter the down direction and whether the profilograph is going to be pushed or pulled into the computer.

In step 138, the user performs the profile run. The raw data from the profile, run including the horizontal information and the vertical information is stored in the memory of the computer during the run.

In step 140, the data from the profile is stored in the computer in real time. In one embodiment of the invention, the raw data is stored unfiltered. The storage of unfiltered data provides the user with a high degree of flexibility in analyzing and processing the data, as is described below.

In step 142, the user enters a "stop" command through either the input device 105A or 105B at the end of the profile run. In response, the computer stops the recording of data and closes the record corresponding to the run just completed.

The steps 130 through 142 describe the operation of the computer 100 while performing a profile run. The steps 130 through 142 are simply repeated for each new profile run. The steps 130 and 132, however, can be skipped on most occasions after initial calibration and set up of the machine. Thereafter, the machine can be calibrated and re-set as needed.

Figure 9:
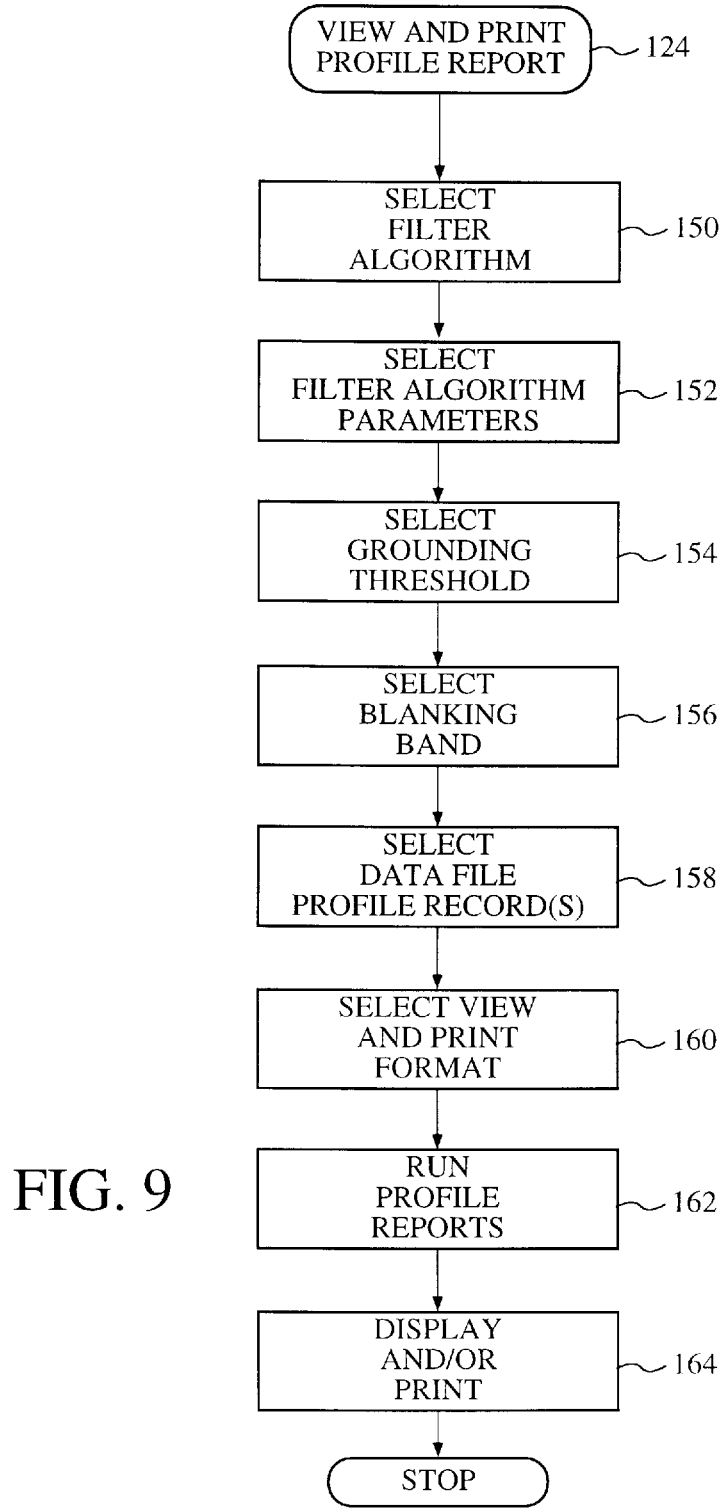
FIG. 9 is a flow diagram illustrating the steps of viewing and generating a profile report according to the present invention.

Referring to FIG. 9, a flow diagram illustrating the steps of viewing and generating a profile report according to the present invention is shown. The viewing and generating a profile report routine includes the following steps:

In step 150, the filtering algorithm to process the recorded data of a record is selected. In one embodiment, low pass and high pass filtering techniques, sometimes referred to as a third order butterworth filter, may be applied to the data of a record. For more information related to butterworth filtering, see the CS8200 Computerized Profilograph Operators Manual, Version 2.16, James Cox and Sons, Inc., P.O. Box 674, Colfax Calif., 95713, incorporated by reference herein. In an alternative embodiment, an averaging filtering technique may be applied. See for example the fifteen point averaging algorithm described in Report no. K-Tran: KSU-93-2, John J. Devore and mustaque Hossain, Kansas State University, Manhattan, Kans., and incorporated by reference herein.

In step 152, the user enters certain filter algorithm parameters into the computer 100. With the butterworth filtering algorithm for example, the filter break point, samples per foot, and other filter settings can be selected and entered by the user. With the averaging filtering technique, the number of averaging points can be selected and entered into the computer 100. For example, the Kansas State report recommends that fifteen averaging points be used. Also the computer users the "length of machine" information previously entered into the computer to select different constants fore the algorithms.

In step 154, the user enters a grinding threshold parameter. The grinding threshold parameter defines the maximum allowable bump or other surface imperfection permitted by the local governmental agency. For example, in California, the bumps and other surface imperfections exceeding 0.3 inches are flagged for resurfacing and/or re-grinding.

In step 156, the blanking band parameter is entered into the computer by the user. The blanking band defines a height threshold under which data samples are ignored. In California, a blanking band of 0.2 inches is recommended. In other states, the blanking band may differ.

In step 158, a particular profile record or record is selected. Each selected profile record is accessed from the computer memory in preparation for filtering.

In step 160, the display format is selected. The user may select that the profile for the selected report be displayed on the display 106, printed on the printer 108, or both.

In step 162, the profile reports for the selected records are run by the computer 100 using the selected filtering technique and the selected parameters.

In step 164, the profile reports generated in step 162 are either displayed on the display 106, printed on the printer 108, or both. The profile reports can also be down loaded to a computer disk 112.

The steps 150 through 164 are repeated for each viewing or printing of a profile report. One advantage of storing raw data, as opposed to filtered data, is that it provides the user with greater flexibility. The user can select one of several filtering algorithms in processing the data. The user can also run multiple profile reports using different parameters and blanking bands on the raw data form a profile run. The raw data can also down loaded to a disk 112, and later analyzed.

Figure 10:
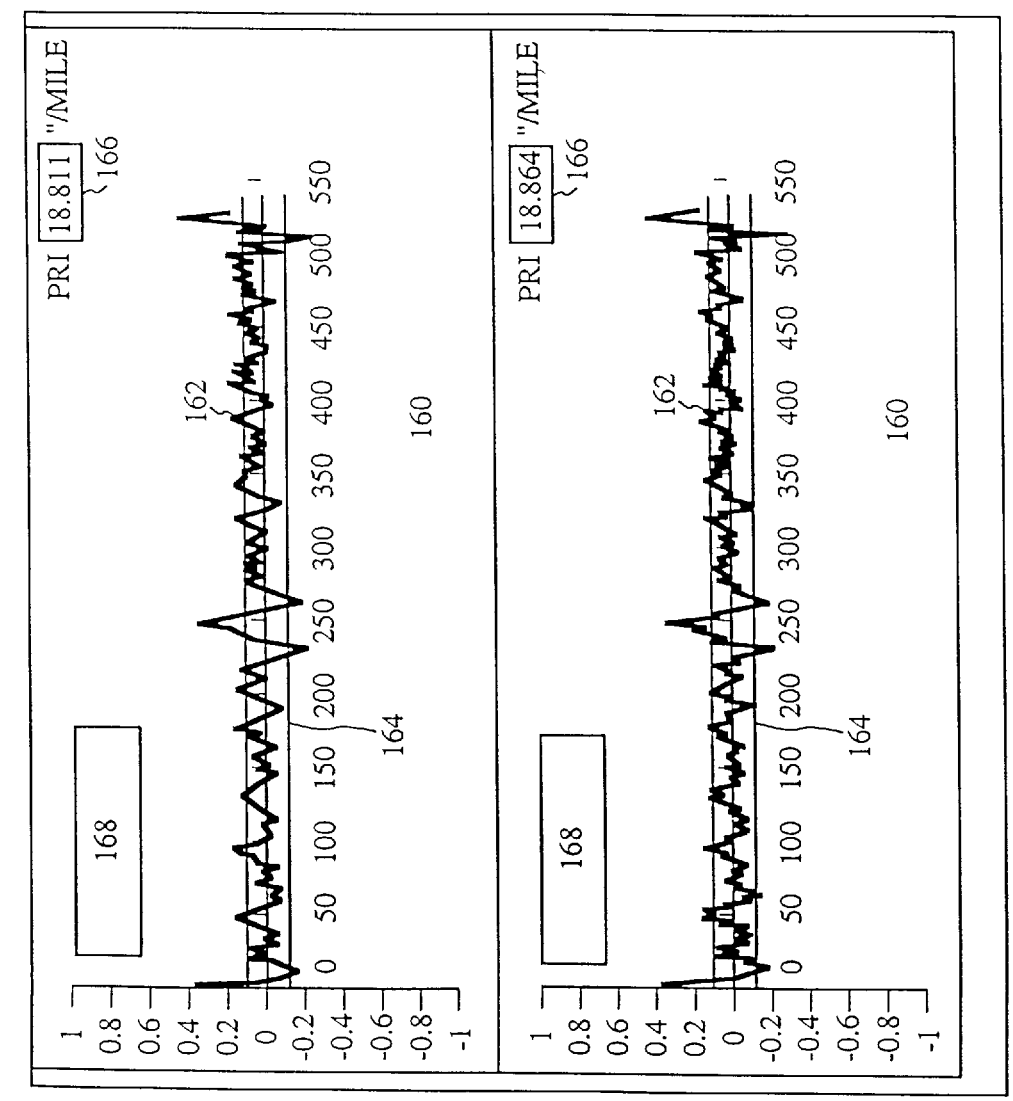
FIG. 10 is a print out of a report for two profiles of parallel and adjacent stretches of highway according to the present invention.

FIG. 10 is a display and/or print out of a report (not to scale) for two profiles of parallel and adjacent stretches of highway according to the present invention. Each profile report 160 includes a road surface profile wave form 162, a blanking band 164 superimposed onto the wave form 162, a window 166 for displaying an overall profile ride index (PRI) value and a window 168 which provides information such as the pass number, type of pavement, route, district, starting point, etc. related to the displayed record. Although only two profiles are shown in FIG. 10, the computer 100 can readily be programmed to display more than two profiles at a time.

While the present invention has been described in relationship to the embodiments described in the specification, other alternatives and embodiments will be apparent to one skilled in the art. It is intended that the specification be only exemplary, and the true scope and spirit of the invention be dictated by the following claims.

What is claimed is:

1. An apparatus comprising:
    an odometer configured to measuring the horizontal movement of the apparatus in either a first direction or a second direction;

a road surface measuring device configured to generate a first set of data points indicative of a first road surface profile when the apparatus is traveling in the first direction and configured to generate a second set of data points indicative of a second road surface profile when the apparatus is traveling in the second direction, the first set of data points and the second set of data points being correlated depending on the travel direction of the apparatus;

a computation device configured to generate a first plot of the profile of the first road surface from the first set of data points and to generate a second plot of the profile of the second road surface from the second set of data points.

2. The apparatus of claim 1, further comprising an input device, coupled to the computation device, the input device configured to inform the computation device to generate the road surface profile report for either the first direction or the second direction.

3. The apparatus of claim 2, wherein the computation device is a portable computer.

4. The apparatus of claim 3, wherein the computer further comprises at least one of the following; a display device for displaying the road surface profile report; an electronic storage medium for storing the road surface profile report; and a printer, coupled to the portable computer, for printing the road surface profile report.

5. The apparatus of claim 3, further comprising a first handle, coupled to a first end of the apparatus, for pushing/pulling the apparatus in the first direction, and a second handle, coupled to a second end of the apparatus, for pushing/pulling the apparatus in the second direction.

6. The apparatus of claim 3, further comprising a first hitch, coupled to a first end of the apparatus, for pulling the apparatus in the first direction, and a second hitch, coupled to a second end of the apparatus, for pulling the apparatus in the second direction.

7. The apparatus of claim 1, further comprising a display device, the computation device configured to cause the first plot to be displayed adjacent the second plot on the display.

8. The apparatus of claim 7, wherein the computation device is configured to cause more than two plots to be adjacently displayed on the display device.

9. The apparatus of claim 1, further comprising a printer device, the computation device configured to cause the printer to print the first plot adjacent the second plot.

10. The apparatus of claim 1, further comprising a storage device, coupled to the computation device, the storage device configured to store the first set of data points generated from the first road surface profile and the second set of data points generated from the second road surface profile.

11. The apparatus of claim 1, wherein the first set of data points is sampled relative to a first incremental sequence of sampling intervals.

12. The apparatus of claim 11, wherein the second set of data points is sampled relative to a second incremental sequence of sampling intervals, opposite the first incremental sequence of sampling intervals.

13. An apparatus comprising:

a computer configured to generate road surface profile reports, the computer comprising:

an input port configured to receive horizontal movement information and vertical height information generated during a profile run of the apparatus;

a memory, coupled to the input port, and configured to store the horizontal movement information and the vertical height information in an unprocessed form, the horizontal movement information being correlated depending on the travel direction of the apparatus; and a processing unit, coupled to the memory, and configured to receive the horizontal movement information and the vertical height information in an unprocessed form and further configured to generate a road surface profile report from the horizontal movement information and the vertical height information using a processing algorithm.

14. The apparatus of claim 13, wherein the processing unit is configured to generate more than one of the road surface profile reports and the presentation unit is further configured to simultaneously present the more than one road surface profile reports.

15. The apparatus of claim 13, wherein the presentation unit includes one among the following group of presentation units, including: a printer, a computer display, and a plotter.

16. The apparatus of claim 13, further comprising an encryption element, coupled to the processing unit, for encrypting the horizontal movement information and the vertical height information of the profile run.

17. The apparatus of claim 13, wherein the processing unit is configured to process the unprocessed horizontal movement information and the vertical height information stored in the memory using a butterworth filtering algorithm.

18. The apparatus of claim 13, wherein the processing unit is configured to process the unprocessed horizontal movement information and the vertical height information stored in the memory using an averaging point algorithm.

19. The apparatus of claim 13, wherein the input port is further configured to receive the horizontal information if either the profilograph is moving in a first direction or a second direction.

20. The apparatus of claim 13, wherein the processing unit is configured to generate a second profile run, in the opposite direction of the profile run, and to invert the second profile run so that it is presented in the same direction as the profile run.

21. The apparatus of claim 13, wherein the processing algorithm includes a filtering algorithm.

22. The apparatus of claim 21, wherein the filtering algorithm includes at least one of the following filtering algorithms: a low pass filter, a high pass filter, a third-order butterworth filter, or an averaging filter.

23. The apparatus of claim 13, wherein the processing algorithm includes a set of variable parameters that can be entered into the processing unit.

24. The apparatus of claim 23, wherein the set of variable parameters includes at least one of the following variable parameters: length of apparatus, sampling rate, grinding threshold, blanking band, and the number of averaging points.

25. The apparatus of claim 13, further comprising an input device coupled to the processing unit, the input device configured to input direction data indicative of the direction of the profile run to the processing unit.

26. An apparatus configured to measure the surface profile of a first run and an adjacent second run of a road surface, the apparatus comprising:

a first measuring device configured to measure the horizontal movement of the apparatus along the road surface;

a second measuring device configured to measure the vertical profile of the road surface when the apparatus is moving horizontally along the road surface; and a computation device, coupled to the first measuring device and the second measuring device, the computation device configured to generate a first surface profile plot of the first run of the apparatus along the road surface and to generate a second surface profile plot of the second run of the apparatus along the road surface, wherein the second plot is correlated to the first plot, without having to return the apparatus to the starting point of the first run to begin the second run or turning the apparatus around to start the second profile run.

27. The apparatus of claim 26, further comprising a display device, the computation device configured to cause the first surface profile plot to be displayed adjacent the second surface profile plot on the display.

28. The apparatus of claim 27, wherein the computation device is configured to cause more than two plots to be adjacently displayed on the display device.

29. The apparatus of claim 26, further comprising a printer device, the computation device configured to cause the first surface profile plot to print adjacent the second surface profile plot.

30. The apparatus of claim 26, further comprising a storage device, coupled to the computation device, and configured to store a first set of data points associated with the first surface plot and a second set of data points associated with the second surface plot.

31. The apparatus of claim 26, wherein the first set of data points is measured when the apparatus is travelling in a first direction and the second set of data points is measured when the apparatus is travelling in a second direction.

32. The apparatus of claim 26, further comprising an input device, coupled to the computation device, the input device configured to input direction data which indicates the direction of the first run and the second run.

* * * * *